United States Patent
Aoki et al.

(10) Patent No.: US 11,292,074 B2
(45) Date of Patent: Apr. 5, 2022

(54) SPOT WELDING APPARATUS THAT JUDGES WELDING STATE

(71) Applicant: FANUC CORPORATION, Yamanashi (JP)

(72) Inventors: Toshimichi Aoki, Yamanashi (JP); Yasuhiro Amagata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 313 days.

(21) Appl. No.: 15/678,426

(22) Filed: Aug. 16, 2017

(65) Prior Publication Data
US 2018/0056434 A1    Mar. 1, 2018

(30) Foreign Application Priority Data
Aug. 30, 2016  (JP) .............................. JP2016-167865

(51) Int. Cl.
| | |
|---|---|
| *B23K 11/25* | (2006.01) |
| *B23K 11/11* | (2006.01) |
| *G05B 13/02* | (2006.01) |
| *B23K 11/18* | (2006.01) |
| *B23K 11/31* | (2006.01) |
| B23K 101/00 | (2006.01) |
| B23K 103/10 | (2006.01) |
| B23K 101/18 | (2006.01) |

(52) U.S. Cl.
CPC .......... *B23K 11/255* (2013.01); *B23K 11/115* (2013.01); *B23K 11/185* (2013.01); *B23K 11/315* (2013.01); *G05B 13/0265* (2013.01); *B23K 2101/006* (2018.08); *B23K 2101/18* (2018.08); *B23K 2103/10* (2018.08)

(58) Field of Classification Search
CPC ... B23K 11/115; B23K 11/185; B23K 11/255; B23K 11/315; B23K 2101/006; B23K 2101/18; B23K 2103/10; B23K 11/252; G05B 13/0265
USPC ................................ 219/86.51, 89, 108–110
See application file for complete search history.

(56) References Cited

U.S. PATENT DOCUMENTS

| | | | |
|---|---|---|---|
| 3,553,420 A |   | 1/1971 | Shearer, Jr. et al. |
| 5,582,747 A | * | 12/1996 | Sakai ................... B23K 11/253 219/86.41 |

(Continued)

FOREIGN PATENT DOCUMENTS

| | | |
|---|---|---|
| CN | 101201339 A | 6/2008 |
| CN | 101339097 A | 1/2009 |

(Continued)

*Primary Examiner* — Justin C Dodson
(74) *Attorney, Agent, or Firm* — RatnerPrestia

(57) ABSTRACT

A spot welding apparatus includes a spot welding gun and a welding gun control apparatus. The welding gun control apparatus includes a pressurizing force control part controlling the pressurizing force, a position control part controlling the position of at least one electrode, and a determination part determining whether or not the welding is performed in a normal state. The position control part controls an electrode drive motor so as to hold the electrodes, after the supply of the electric current is started, at positions when the initial pressurizing force is applied before the electric current is supplied. The determination part acquires the pressurizing force and determines whether or not the welding is performed in a normal state based on change tendency in the pressurizing force.

6 Claims, 9 Drawing Sheets

(56) References Cited

U.S. PATENT DOCUMENTS

| | | | | |
|---|---|---|---|---|
| 6,018,729 | A | * | 1/2000 | Zacharia ............... G05B 13/027 |
| | | | | 219/110 |
| 6,232,572 | B1 | * | 5/2001 | Kanjo .................... B23K 11/115 |
| | | | | 219/110 |
| 6,313,427 | B1 | | 11/2001 | Suita |
| 7,600,435 | B2 | | 10/2009 | Aoki et al. |
| 2011/0180518 | A1 | * | 7/2011 | Hasegawa ............. B23K 11/115 |
| | | | | 219/108 |
| 2012/0296471 | A1 | * | 11/2012 | Inaba ....................... B25J 9/163 |
| | | | | 700/253 |
| 2014/0291300 | A1 | * | 10/2014 | Amagata ............... B23K 11/311 |
| | | | | 219/90 |
| 2015/0209891 | A1 | * | 7/2015 | Aoki ..................... B23K 11/115 |
| | | | | 348/90 |

FOREIGN PATENT DOCUMENTS

| | | | |
|---|---|---|---|
| CN | 102139406 | A | 8/2011 |
| DE | 69919819 | T2 | 9/2005 |
| DE | 102012025196 | A1 | 7/2014 |
| JP | H10128552 | A | 5/1998 |
| JP | H10128556 | A | 5/1998 |
| JP | 2002239743 | A | 8/2002 |
| JP | 3598683 | B | 12/2004 |

\* cited by examiner

SPOT WELDING APPARATUS THAT JUDGES WELDING STATE

BACKGROUND OF THE INVENTION

1. Field of the Invention

The present invention relates to a spot welding apparatus.

2. Description of the Related Art

For joining metal parts in a product manufacturing process, spot welding is conventionally used. For example, in manufacturing a car body, spot welding is used in order to affix parts together. In car manufacturing, efforts have been made for weight reduction of car bodies in order to improve fuel mileage. In a method for reducing the weight, parts that are used in the product can be formed with a light material. In one method for reducing the weight of car bodies, aluminum-based parts can be used instead of conventional iron-based parts. Aluminum-based parts can be joined together by laser beam welding, by friction stir welding, or by adhesives. Spot welding is most commonly used in view of equipment cost or reliability of joined spots.

When joining aluminum-based parts by spot welding, there are different technical problems to be tackled, compared with the spot welding of iron-based pieces. For example, aluminum-based parts have higher heat-conductivity and they may be cooled down rapidly since heat is lost during the welding. When the parts are cooled down rapidly, a crack may be formed in the weld.

Japanese Patent No. 3598683 discloses a method of controlling the position of the electrode of a welding gun for performing spot welding. It this method, the position of the welding electrode in the press direction is controlled at a predetermined position for attaining a desired quality when electric current is supplied.

SUMMARY OF THE INVENTION

In spot welding, a workpiece is sandwiched by a pair of electrodes. When electric current is supplied through the electrodes, the boundary part of the pieces to be joined melts and a nugget is formed. When the supply of the current is continued, the nugget grows and the weld will expand. When an aluminum-based workpiece or the like is used, a control may be performed for applying a high pressurizing force to the workpiece while electric current is supplied in order to avoid too rapid cooling of the weld. By maintaining high pressurizing force, the increase of the electric resistance can be suppressed, whereby the welding current can be concentrated on the weld effectively.

For example, as disclosed in the above-described patent literature, the electrode can be held at the same position. However, the welding current may increase beyond the desired value during the period in which the electrode is held at the same position. As the welding current increases, heat input to the weld increases, resulting in too rapid a growth of the nugget. In this case, the pressurizing force becomes excessive, which may eventually cause the weld to splash, resulting in spatter. The above-described patent literature also discloses a control for correcting the pressurizing force when the pressurizing force decreases to a predetermined value. However, in this control, the correction of the pressurizing force is not completed in the predetermined time and a crack or the like may occur in the weld.

The spot welding apparatus according to the present invention includes a spot welding gun including a pair of electrodes disposed opposite to each other and an electrode drive motor driving at least one electrode of the pair of electrodes. The spot welding apparatus includes a welding gun control apparatus controlling the spot welding gun. The welding gun control apparatus includes a pressurizing force control part controlling pressurizing force, and a pressurizing force detection part detecting a pressurizing force that the pair of electrodes apply to a workpiece. The welding gun control apparatus includes a position control part controlling a position of the at least one electrode. The welding gun control apparatus includes a determination part that determines, during a period in which electric current is supplied to the electrodes, whether or not welding is performed in a normal state and a storage part storing information that relates to the welding. The pressurizing force control part controls the electrode drive motor so that the pressurizing force applied to the electrodes is a predetermined initial pressurizing force before electric current is supplied. The position control part controls the electrode drive motor so as to hold the electrode, after the supply of the electric current is started, at positions when the initial pressurizing force is applied before the electric current is supplied. The determination part acquires the pressurizing force detected by the pressurizing force detection part. The determination part determines whether or not the welding is performed in a normal state based on change tendency including at least one of an inclination of the pressurizing force during a period in which the pressurizing force increases, an inclination of the pressurizing force during a period in which the pressurizing force decreases, and a maximal value of the pressurizing force.

In the above-described invention, the storage part can store a judgement range for the inclination of the pressurizing force with respect to a magnitude of the pressurizing force during the period in which the pressurizing force increases or the period in which the pressurizing force decreases. The determination part can determine that the welding is performed in an abnormal state when the inclination of the pressurizing force at a predetermined magnitude of the pressurizing force is out of the judgement range.

In the above-described invention, the storage part can store a judgement range for the inclination of the pressurizing force with respect to a predetermined time after the supply of the electric current is started. The determination part can determine that the welding is performed in an abnormal state when the inclination of the pressurizing force at the predetermined time after the supply of the electric current is started is out of the judgement range.

In the above-described invention, the storage part can store a judgement range for the inclination of the pressurizing force with respect to predetermined time interval after the supply of the electric current is started. The determination part can determine whether or not the inclination of the pressurizing force is out of the judgement range in the predetermined time intervals. The determination part can determine that the welding is performed in the abnormal state when the inclination of the pressurizing force is out of the judgement range.

In the above-described invention, the spot welding apparatus can include a machine learning apparatus setting a judgement range for the change tendency by machine learning.

In the above-described invention, the determination part can detect that the inclination of the pressurizing force is out of a predetermined judgement range, the position control part can stop the control for holding the electrodes in a same position after the supply of the electric current is started while the pressurizing force control part can control the electrode drive motor so as to decrease the absolute value of the inclination of the pressurizing force.

In the above-described invention, the welding gun control apparatus can include a notification part for notifying another apparatus of the welding state. The notification part can notify another apparatus that the welding is performed in an abnormal state when the determination part determines that the welding is performed in the abnormal state.

DETAILED DESCRIPTION

With reference to FIG. 1 to FIG. 12, a spot welding apparatus according to an embodiment will be described. The spot welding apparatus according to the present embodiment is supported by a robot.

Figure 1:
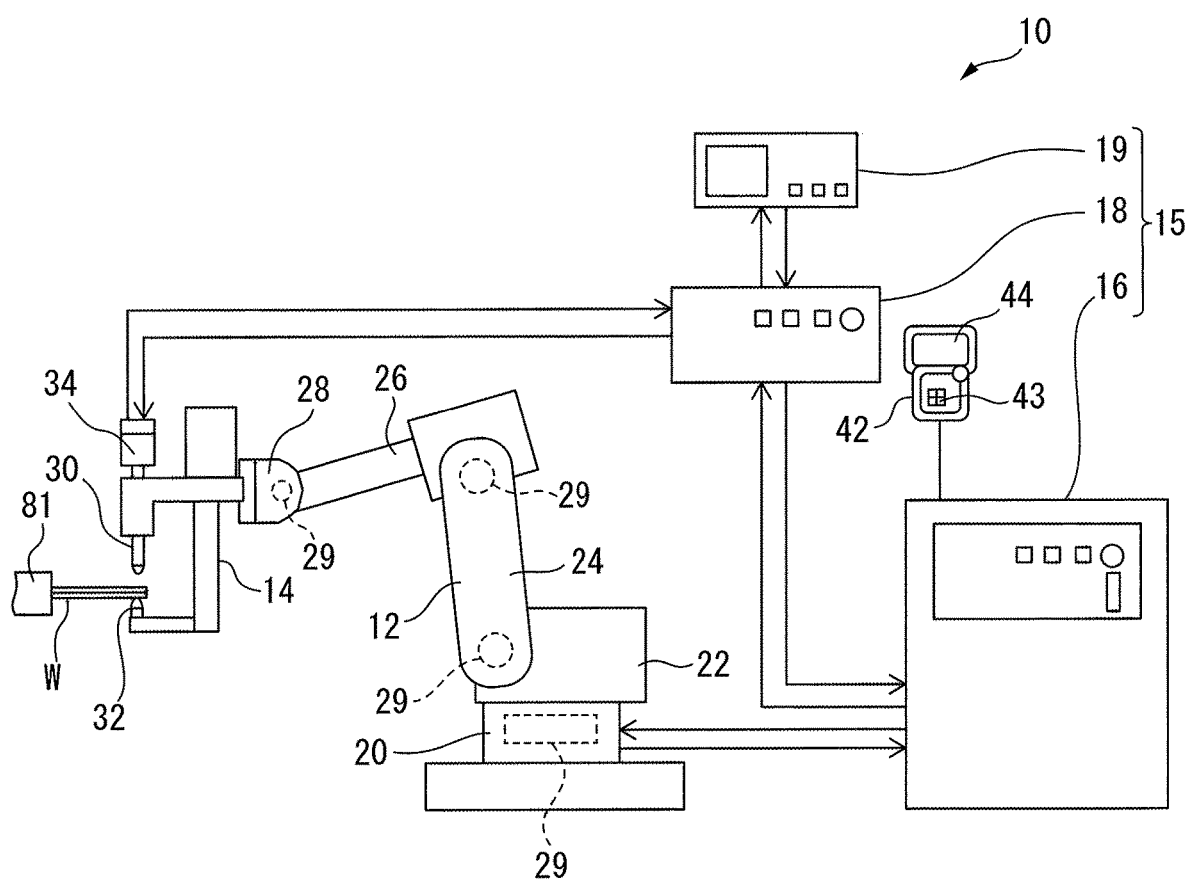
FIG. 1 is a schematic diagram of first spot welding apparatus according to an embodiment.
Figure 2:
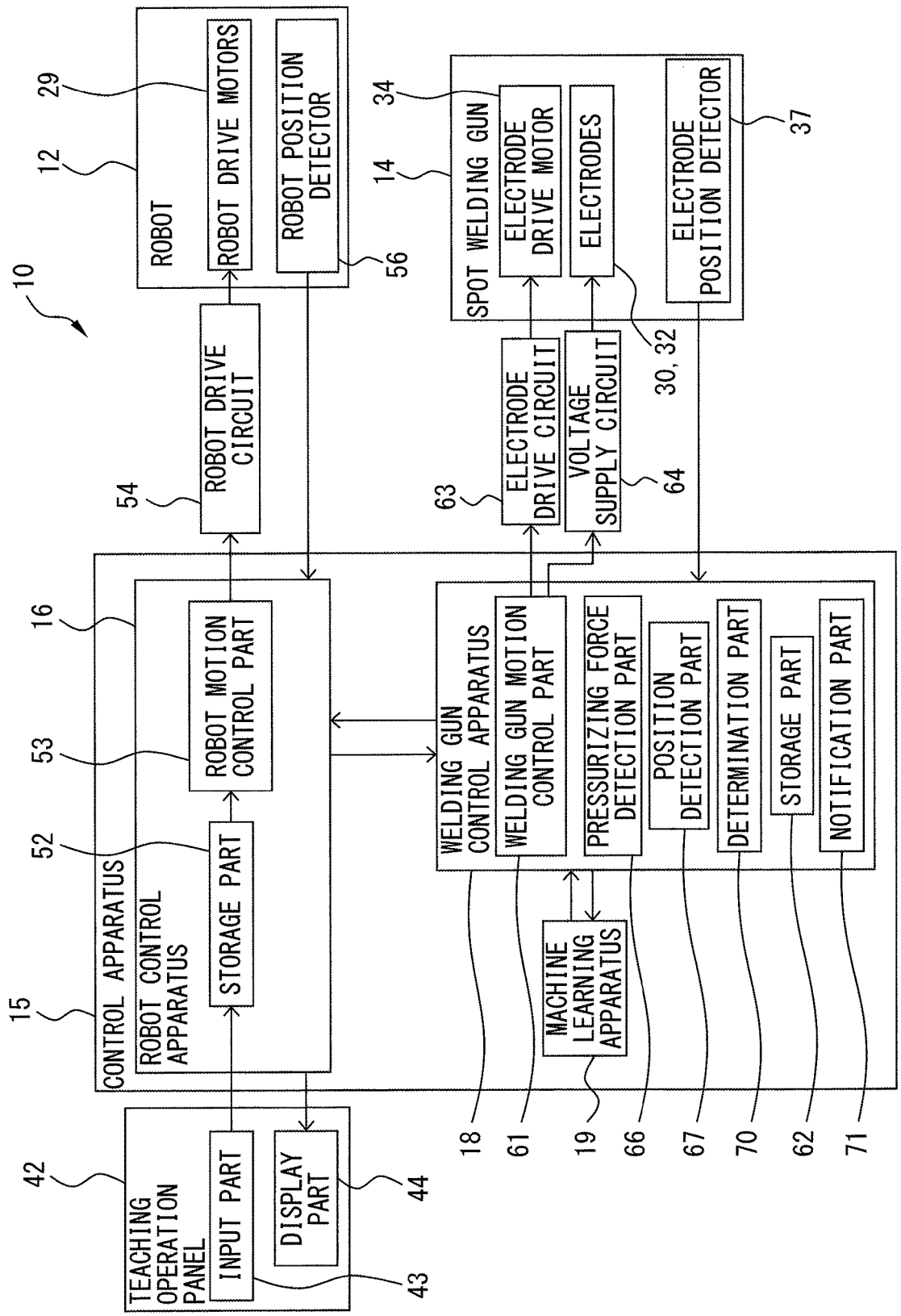
FIG. 2 is a block diagram of the first spot welding apparatus according to the embodiment.

FIG. 1 shows a schematic diagram of first spot welding apparatus according to the present embodiment. FIG. 2 shows a block diagram of the first spot welding apparatus according to the present embodiment. With reference to FIG. 1 and FIG. 2, the spot welding apparatus 10 according to the present embodiment includes a robot 12 and a spot welding gun 14. The robot 12 according to the present embodiment is an articulated robot having a plurality of joint units. The spot welding apparatus 10 includes a control apparatus 15 that controls the robot 12 and the spot welding gun 14.

The control apparatus 15 includes a robot control apparatus 16 that controls the robot 12 and a welding gun control apparatus 18 that controls the spot welding gun 14. The robot control apparatus 16 and the welding gun control apparatus 18 each include an electrical control unit having a CPU (Central Processing Unit), RAM (Random Access Memory), ROM (Read Only Memory) and other devices connected with one another via a bus. The robot control apparatus 16 and the welding gun control apparatus 18 are configured to communicate with each other. The control apparatus is not limited to this embodiment, and the robot 12 and the spot welding gun 14 may be controlled by one apparatus.

The spot welding apparatus 10 is configured so that the position and the posture of the spot welding gun 14 can be changed by being driven by the robot 12. In the first spot welding apparatus 10, a workpiece W to be welded is held on a fixing device 81.

The robot 12 includes a base 20 installed on the floor and a swivel base 22 that is formed so as to rotate around an axis extending vertically. The robot 12 includes a lower arm 24 which is rotatably supported by the swivel base 22, and an upper arm 26 which is rotatably supported by the lower arm 24. The robot 12 further includes a wrist part 28 rotatably supported by the upper arm 26. The robot 12 includes a plurality of robot drive motors 29 for respectively driving the swivel base 22, the lower arm 24, the upper arm 26, and the wrist part 28. The position and the posture of the robot 12 are changed by drive of the robot drive motors 29.

The spot welding apparatus 10 according to the present embodiment includes a operation panel 42 connected to the control apparatus 15. The operation panel 42 includes an input part 43 for inputting information that relates to the robot 12 and the spot welding gun 14. The operator can input an operation program, a judgement range, and the like to the control apparatus 15 by using the input part 43. The input part 43 is constituted by a keyboard, a dial, or the like. The operation panel 42 includes a display part 44 for indicating information that relates to the robot 12 and the spot welding gun 14.

The robot control apparatus 16 includes a storage part 52 for storing information that relates to the control of the robot 12. The robot control apparatus 16 includes a robot motion control part 53 for controlling the robot drive motors 29. The robot motion control part 53 sends a motion command based on the operation program to a robot drive circuit 54. The robot drive circuit 54 supplies the electric current in accordance with the motion command to the robot drive motors 29.

The robot 12 includes a robot position detector 56 for detecting the position and the posture of the robot 12. The robot position detector 56 according to the present embodiment is constituted by a rotation angle detector attached to the robot drive motor 29. The robot control apparatus 16 receives a signal of a rotational position outputted by the robot position detector 56. The robot control apparatus 16 can detect the position and the posture of the spot welding gun 14 based on the position and the posture of the robot 12.

Figure 3:
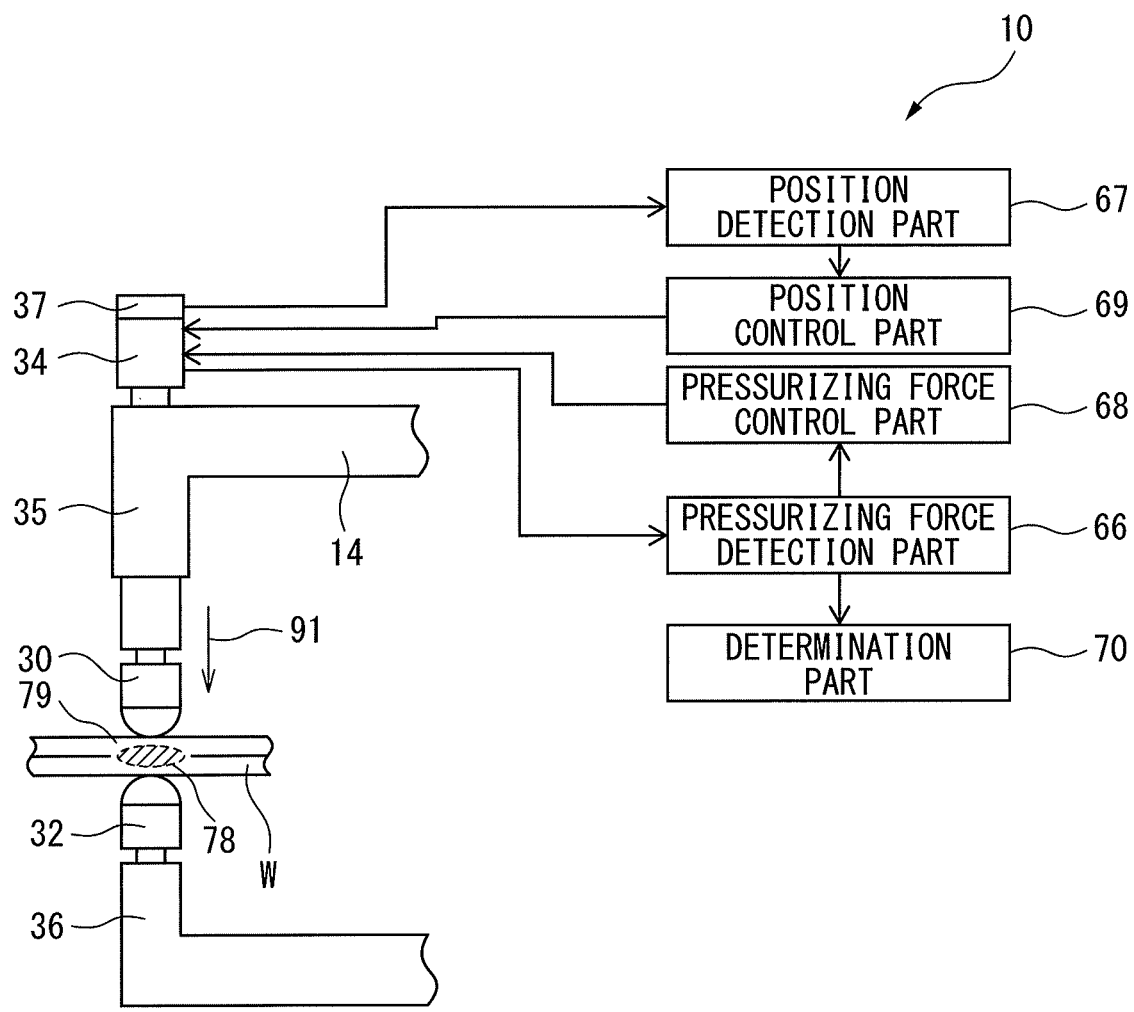
FIG. 3 is an enlarged schematic diagram of a spot welding gun and a workpiece according to the embodiment.

FIG. 3 shows an enlarged schematic diagram of the spot welding gun of the first spot welding apparatus and a workpiece according to the present embodiment. With reference to FIG. 1 to FIG. 3, the spot welding gun 14 includes a pair of electrodes 30, 32 that are coaxially arranged. The spot welding gun 14 includes a movable electrode 30 and an opposite electrode 32 disposed opposite to the movable electrode 30. The movable electrode 30 is supported by a gun arm 35. The opposite electrode 32 is supported by a gun arm 36.

The spot welding gun 14 includes an electrode drive apparatus for driving at least one electrode of the pair of electrodes. The electrode drive apparatus according to the present embodiment includes an electrode drive motor 34 for driving the movable electrode 30. The movable electrode 30 moves along the axis of the movable electrode 30. The electrode drive motor 34 is driven, whereby the movable electrode 30 moves toward the opposite electrode 32 or moves in a direction which is away from the movable electrode 30. In the present embodiment, the opposite electrode is fixed in a predetermined position, but the invention is not limited thereto and the electrode drive apparatus may be configured so as to drive both electrodes. Further, the electrode drive apparatus can drive the electrodes by any mechanism. For example, the electrode drive apparatus may be configured so as to drive the electrodes by fluid such as compressed air or control oil.

The welding gun control apparatus 18 includes a welding gun motion control part 61 that controls the electric current supplied to the electrode drive motor 34 and the voltages applied to the electrodes 30, 32. The welding gun motion control part 61 sends a motion command based on the operation program to the electrode drive circuit 63 and the voltage supply circuit 64. The electrode drive circuit 63 supplies the electric current to the electrode drive motor 34 in accordance with the motion command. The voltage supply circuit 64 supplies voltages in accordance with the motion command to the movable electrode 30 and the opposite electrode 32. The welding gun control apparatus 18 also includes storage part 62 for storing information that relates to the welding.

The spot welding gun 14 includes an electrode position detector 37 for detecting the position of the movable electrode 30. The electrode position detector 37 according to the present embodiment is constituted by an encoder attached to the electrode drive motor 34.

When performing welding, first, the robot motion control part 53 drives the robot 12. The robot 12 moves the spot welding gun 14 so that the workpiece W is located between the movable electrode 30 and the opposite electrode 32. Next, the welding gun motion control part 61 moves the movable electrode 30 toward the workpiece W as indicated by the arrow 91. The movable electrode 30 touches the workpiece W. The welding gun control apparatus 18 detects the contact of the movable electrode 30 with the workpiece W. The spot welding gun 14 sandwiches the workpiece W between the movable electrode 30 and the opposite electrode 32.

Next, the spot welding gun 14 supplies the electric current between the movable electrode 30 and the opposite electrode 32 so as to perform welding. During this time, a nugget 78 is formed in the weld 79 of the workpiece W. The nugget 78 is a part in which the boundary part of the more than one pieces is molten and solidifies by being cooled.

In performing a spot welding, the spot welding apparatus according to the present embodiment melts an inner part of the weld 79 while pressurizing force is applied on the workpiece W by the pair of electrodes 30, 32. An electric current is supplied to the electrode drive motor 34 so as to cause the movable electrode 30 to move toward the opposite electrode 32. The movable electrode 30 presses the workpiece W, whereby pressurizing force is applied to the workpiece W.

Figure 4:
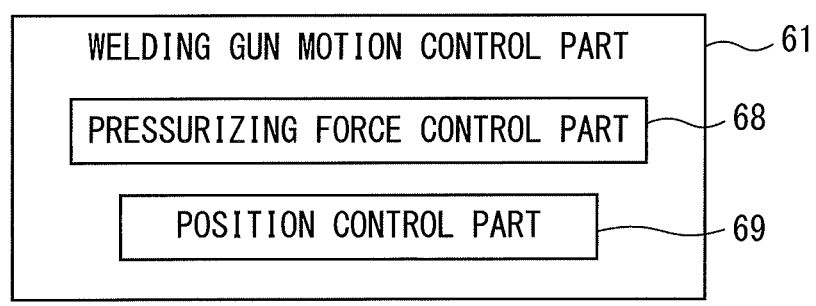
FIG. 4 is a block diagram of a welding gun motion control part according to the embodiment.

FIG. 4 shows a block diagram of a welding gun motion control part according to the present embodiment. With reference to FIG. 2 to FIG. 4, the welding gun control apparatus 18 includes a pressurizing force detection part 66 for detecting the pressurizing force applied to the workpiece W by the electrode 30, 32. The welding gun motion control part 61 includes a pressurizing force control part 68 that controls the pressurizing force. The welding gun control apparatus 18 also includes a position detection part 67 for detecting the positions of the electrodes 30, 32. The welding gun motion control part 61 includes a position control part 69 that controls the positions of the electrodes 30, 32.

Figure 5:
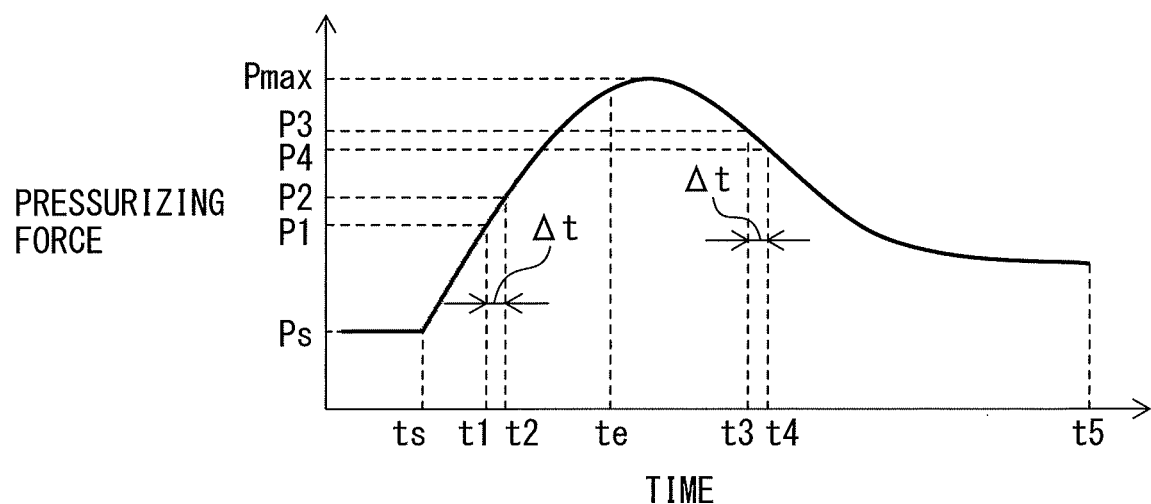
FIG. 5 is a graph for illustrating first control and second control for judging a welding state according to the embodiment.

FIG. 5 shows a graph of pressurizing force as a function of time when the spot welding is performed by the spot welding apparatus according to the present embodiment. FIG. 5 illustrates the change of pressurizing force in a normal welding state. With reference to FIG. 2 to FIG. 5, the welding gun motion control part 61 performs a control for moving the movable electrode 30 so as to hold the workpiece W between the movable electrode 30 and the opposite electrode 32.

Next, the pressurizing force control part 68 of the welding gun motion control part 61 performs a control for applying a predetermined initial pressurizing force Ps to the workpiece W. The magnitude of the pressurizing force on the workpiece W corresponds to the magnitude of electric current supplied to the electrode drive motor 34. According to the present embodiment, an initial electric current value corresponding to the initial pressurizing force Ps is determined in advance. The pressurizing force control part 68 controls the electrode drive circuit 63 so as to supply the electric current of the initial electric current value to the electrode drive motor 34. A pressurizing force Ps serving as first pressurizing force is applied to the workpiece W. After the pressurizing force Ps is applied, the position detection part 67 detects the position of the movable electrode 30, based on the output of the electrode position detector 37. The storage part 62 stores the position of the movable electrode 30 at the time when the first pressurizing force Ps is applied.

Next, the welding gun motion control part 61 changes the control so as to hold the pair of electrodes 30, 32 in the same positions after the supply of the electric current is started. The pressurizing force control part 68 stops the control for applying the pressurizing force Ps. The position control part 69 starts a control for maintaining the present positions of the electrodes 30, 32. The position control part 69 controls the electrode drive motor 34 based on the output of the electrode position detector 37.

As described above, the control by the pressurizing force control part 68 can be changed to the control by the position control part 69 before the supply of the electric current is started. Alternatively, the control by the pressurizing force control part 68 is changed to the control by the position control part 69 at the same time as the start of the supply of electric current.

As the supply of electric current starts, a nugget 78 is formed in the weld 79 of the workpiece W. The nugget 78 grows as the supply of electric current continues. The weld 79 of the workpiece W expands because of this. The opposite electrode 32 is in a fixed position. In order to hold the movable electrode 30 in the same position, it is necessary to increase the force with which the movable electrode 30 presses the workpiece W. In other words, it is necessary to increase the pressurizing force.

The position detection part 67 detects the position of the movable electrode 30 based on the output of the electrode position detector 37. The position control part 69 controls the electric current supplied to the electrode drive motor 34 so as to hold the movable electrode 30 in the same position. In other words, when the movable electrode 30 moves away from the opposite electrode 32, the position control part 69 performs a control for increasing the electric current supplied to the electrode drive motor 34. During the period in which the nugget 78 shrinks, the position control part 69 performs a control for decreasing the electric current supplied to the electrode drive motor 34. As described above, the position control part 69 performs a control for adjusting the electric current supplied to the electrode drive motor 34 in response to a growth or shrinkage of the nugget 78.

In the example illustrated in FIG. 5, the welding gun motion control part 61 starts supplying electric current at time ts. When the supply of electric current is started, the weld 79 of the workpiece W is heated. A central part of the weld 79 melts by heat of fusion, whereby a nugget 78 is generated. During the period in which the current is supplied, the nugget 78 grows and the weld 79 expands. The position control part 69 holds the movable electrode 30 at the position in which the movable electrode 30 was when the pressurizing force reached the first pressurizing force Ps. The expansive force causes an elastic deformation of the gun arms 35, 36 since the force has nowhere else to go. The reaction force of the elastic deformation increases the pressurizing force applied by the movable electrode 30.

The pressurizing force increases in accordance with the growth of the nugget 78. As the nugget 78 grows, the electric current supplied to the electrode drive motor 34 increases. After the supply of electric current is stopped at time te, the heat input to the workpiece W decreases. The nugget 78 gradually shrinks by being cooled. The position control part 69 keeps the position of the movable electrode 30 to the position at the time when the pressurizing force reached the first pressurizing force Ps. As the nugget 78 shrinks, the pressurizing force gradually decreases due to the elastic deformation of the gun arms 35, 36. As the nugget 78 shrinks, the electric current supplied to the electrode drive motor 34 decreases. At a predetermined time t5, the welding terminates.

The position control part 69 terminates the control for holding the movable electrode 30 in the same position. The welding gun motion control part 61 moves the movable electrode 30 in the direction that is away from the workpiece W. The robot motion control part 53 drives the robot drive motors 29 so as to move the spot welding gun 14 away from the workpiece W.

Although the supply of electric current is stopped at a predetermined time to according to the present embodiment, the invention is not limited thereto and a control may be performed so that the level of the current is maintained at a predetermined value and then gradually decreased. When the workpiece W is made mainly of aluminum, for example, the supply of electric current may be gradually reduced instead of completely cut off after the nugget 78 is expanded by supplying electric current.

Figure 6:
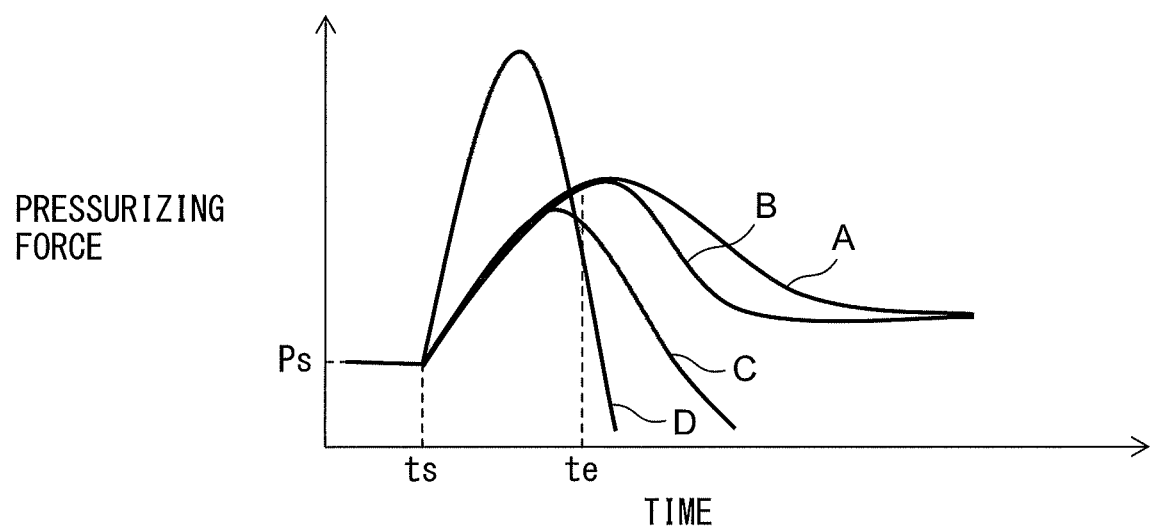
FIG. 6 is graphs for illustrating the changes in the pressurizing force in abnormal states of welding.

FIG. 6 shows graphs of the pressurizing force in cases in which an abnormality has occurred during a spot welding. The graph A represents the pressurizing force when the welding is performed in a normal state. The graphs B to D represent the pressurizing forces when an abnormality has occurred during the welding.

The graph B represents a case in which the nugget is cooled down rapidly. In this case, the magnitude of the reduction rate of the pressurizing force is large. For example, in such a case that the pieces to be welded are mainly made of aluminum, when the temperature of the nugget decreases in a short time, a crack may form inside the nugget due to the residual stress occurring in the nugget. Thus, it is preferable not to allow the nugget to shrink in a very short time in order to ensure a good quality of welding.

The graph C represents a case in which the weld has a rupture in the course of the growth of the nugget. In other words, it represents a phenomenon referred to as "expulsion" that takes place in the weld. In this case, the maximal value of the pressurizing force becomes small. In addition, the reduction rate of the pressurizing force becomes large. The graph D represents a case in which the value of the current supplied to the electrodes is too great. In this case, the nugget is expanded excessively. This eventually causes the weld to splash, resulting in a spatter. In this case, the maximal value of the pressurizing force becomes large. In addition, the increase rate and the reduction rate of the pressurizing force become large.

As described above, when an abnormality occurs in the welding, the change tendency in the pressurizing force is changed. According to the present embodiment, at least one of an inclination of the pressurizing force at the time when the pressurizing force increases, an inclination of the pressurizing force at the time when the pressurizing force decreases, and the maximal value of the pressurizing force is adopted as the change tendency.

With reference to FIG. 2, the welding gun control apparatus 18 according to the present embodiment includes a determination part 70 for determining whether or not the welding is performed in a normal state. The determination part 70 calculates the change tendency during the welding. The determination part 70 determines whether or not the welding is performed in a normal state based on the actual change tendency and a predetermined judgement range. The determination part 70 determines that the welding is performed in an abnormal state when the change tendency is out of the judgement range. The judgement range for the change tendency is predetermined and stored in the storage part 62.

With reference to FIG. 2 and FIG. 5, the determination part 70 performs first control for making a determination based on the inclination of the pressurizing force. At a predetermined time t1, the determination part 70 judges the inclination of the pressurizing force when the pressurizing force increases. At a predetermined time t3, the determination part 70 judges the inclination of the pressurizing force when the pressurizing force decreases.

The pressurizing force detection part 66 detects the value of the electric current supplied to the electrode drive motor 34 at a predetermined time. The pressurizing force detection part 66 can estimate the pressurizing force P based on the value of the electric current supplied to the electrode drive motor 34.

The determination part 70 acquires the pressurizing force P1 at time t1 and the pressurizing force P2 at time t2. The determination part 70 calculates the inclination of the pressurizing force $((P2-P1)/\Delta t)$ at time t1. Time t1 and time t2 are predetermined and stored in the storage part 62. Alternatively, the time difference $\Delta t$ for which the inclination of the pressurizing force is calculated is predetermined and stored in the storage part 62.

With reference to FIG. 6, in the case in which spattering occurs in the graph D, for example, the inclination of the pressurizing force when the pressurizing force increases is greater than the inclination in the normal case that is represented by the graph A. According to the present embodiment, the storage part 62 stores a judgement range for the inclination of the pressurizing force at a time when a predetermined time elapses after the start of the supply of electric current. The determination part 70 compares the inclination of the pressurizing force with the judgement range for inclination of the pressurizing force. The determination part 70 determines that the welding is performed in the abnormal state when the inclination of the pressurizing force is deviated from the judgement range.

With reference to FIG. 2 and FIG. 5, a similar control can be performed at time t3. The determination part 70 acquires the pressurizing force P3 at time t3 and the pressurizing force P4 at time t4. The determination part 70 calculates the inclination $((P4-P3)/\Delta t)$ during the period in which the pressurizing force decreases. The determination part 70 determines that the welding is performed in the abnormal state when the inclination of the pressurizing force is deviated from the judgement range.

With reference to FIG. 6, in the cases represented by the graphs B to D, for example, the inclinations of the pressurizing force during the periods in which the pressurizing force decreases are smaller (the absolute values of the inclinations are greater) than the inclinations of the pressurizing force in the normal case represented by the graph A. The determination part 70 can determine that the welding is performed in the abnormal state when the inclination of the pressurizing force is out of the judgement range.

The determination part 70 may judges at any time during the period in which the electric current is supplied or after the supply of electric current is terminated. In other words, the determination can be made at any time after the supply of electric current is started. In the example illustrated in FIG. 5, the first control is performed once during the period in which the pressurizing force increases and the first control is performed once during the period in which the pressurizing force decreases. The number of times for performing the first control is not limited to this and the first control may be performed more than once during the period in which the pressurizing force increases or the period in which the pressurizing force decreases. The determination part may calculate a plurality of inclinations of the pressurizing force at a plurality of points in time and make a judgement based on the average of the plurality of inclinations. Alternatively, the determination part may make a judgement based on the maximal or minimal value among the plurality of inclinations of the pressurizing force.

Next, second control according to the present embodiment will be described. With reference to FIG. 2 and FIG. 5, in the second control, the determination part 70 uses the maximal value Pmax of the pressurizing force as the change tendency. When the pressurizing force is maximal, the inclination of the pressurizing force is zero. The determination part 70 can determine that the pressurizing force is maximal when the value of the inclination of the pressurizing force changes from a positive value to zero. The determination part 70 determines whether or not the welding is performed in a normal state based on the maximal value of the pressurizing force. The judgement range for the maximal pressurizing force Pmax can be predetermined and stored in the storage part 62. The determination part 70 can detect the maximal pressurizing force Pmax based on the values of pressurizing force that are outputted from the pressurizing force detection part 66.

With reference to FIG. 6, the maximal value of the pressurizing force in the graph C is smaller than the maximal value of the pressurizing force in the graph A representing the normal welding state. Further, the maximal value of the pressurizing force in the graph D is greater than the maximal value of the pressurizing force in the graph A representing the normal welding state. Therefore, the determination part 70 can determine whether or not the welding is performed in a normal state based on the actually detected maximal value of the pressurizing force and the judgement range. The determination part 70 determines that the welding is performed in the abnormal state when the maximal value of the pressurizing force is out of the judgement range. In the case represented by the graph C, the determination part 70 can determine whether or not the nugget grows sufficiently. In the case represented by the graph D, the determination part 70 can determine whether or not the nugget expands excessively due to the supply of the large melting current.

With reference to FIG. 2, the welding gun control apparatus 18 according to the present embodiment includes a notification part 71 for notifying the welding state to another apparatus. When the determination part 70 has determined that the welding is performed in the abnormal state, the notification part 71 notifies another apparatus that the welding is performed in the abnormal state. The notification part 71 according to the present embodiment notifies the operation panel 42 of the welding state via the robot control apparatus 16. The display part 44 can indicate the welding state. For example, the display part 44 indicates the occurrence of an abnormality so as to notify the operator.

An arbitrary apparatus can be adopted as another apparatus in which notification part 71 notifies the welding state. For example, when the control apparatus 15 is connected to a manufacturing control apparatus arranged in another place, a signal indicating an abnormality in the welding may be transmitted to the manufacturing control apparatus.

Alternatively, the notification part 71 notifies the welding gun motion control part 61 and the robot control apparatus 16 of the occurrence of an abnormality. The welding gun motion control part 61 can stop the welding work and the robot motion control part 53 can stop driving the robot 12. Alternatively, when the welding is performed in an abnormal state, the display part 44 may indicate the occurrence of the abnormality in the welding while continuing the subsequent welding operation. Note that, the invention is not limited to the control for notifying another apparatus when the welding is performed in an abnormal state and any control as appropriate may be performed.

The control apparatus 15 according to the present embodiment can perform an auxiliary control for correcting the pressurizing force when the determination part 70 determines that the welding is performed in an abnormal state. First, an example of performing the auxiliary control during the period in which the pressurizing force decreases will be described. The inclination of the pressurizing force may become too small during the period in which the pressurizing force decreases. In other words, the absolute value of the inclination of the pressurizing force may become too great. With reference to FIG. 6, the graph B represents an example in which the nugget 78 cools down rapidly. For example, in the case represented by the graph B, when electric current is supplied to the electrodes 30, 32 in order to restrain the nugget from cooling down too rapidly, the resistance in the weld increases due to some reason, whereby the flow of welding electric current is obstructed.

Figure 7:
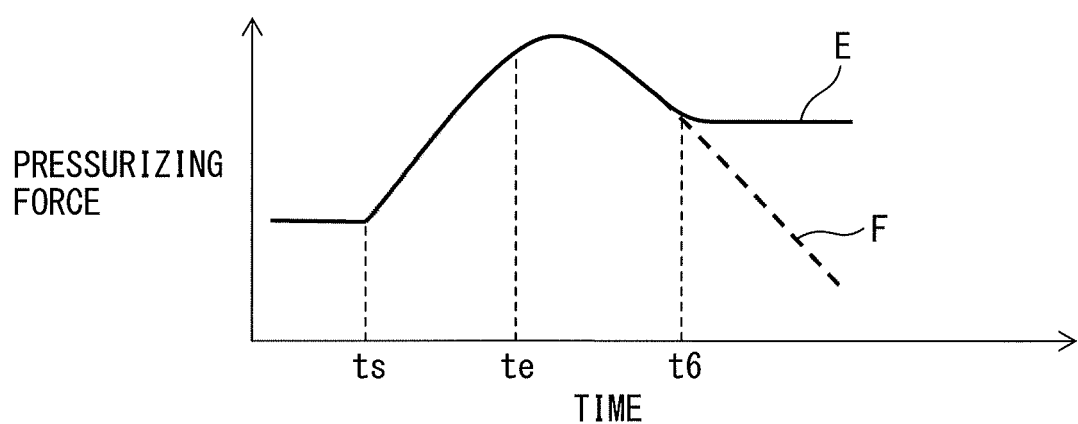
FIG. 7 is a graph for illustrating an auxiliary control according to the embodiment.

FIG. 7 shows a graph for illustrating an auxiliary control according to the present embodiment. Similarly to the above-described graph B, the graph F represents a case in which the nugget 78 cools down rapidly. The determination part 70 detects that the inclination of the pressurizing force is out of the predetermined judgement range during the period in which the pressurizing force decreases. In this example, the determination part 70 detects that the inclination of the pressurizing force is out of the predetermined judgement range at time t6. The position control part 69 stops the control for holding the movable electrode 30 in the same position. The pressurizing force control part 68 performs a control for restraining the decrease of the pressurizing force. The pressurizing force control part 68 controls the electrode drive motor so as to decrease the absolute value of the inclination of the pressurizing force.

The pressurizing force control part 68 performs a control for pressing the movable electrode 30 onto the workpiece W. The pressurizing force control part 68 according to the present embodiment increases electric current supplied to the electrode drive motor 34 so as to increase the pressurizing force by a predetermined amount of increase. The relation between the amount of increase of the pressurizing force and the amount of increase of the electric current supplied to the electrode drive motor 34 is predefined and stored in the storage part 62.

Alternatively, the pressurizing force control part 68 acquires the pressurizing force from the pressurizing force detection part 66. The pressurizing force control part 68 may increase the electric current supplied to the electrode drive motor 34 until the inclination of the pressurizing force reaches a predetermined inclination. In this case, the pressurizing force control part 68 may, for example, increase the electric current by a predetermined amount of increase. The pressurizing force control part 68 acquires the pressurizing force at predetermined intervals and calculates the inclination of the pressurizing force. The pressurizing force control part 68 may perform a feedback control by further increasing the electric current when the inclination of the pressurizing force does not reach a predetermined inclination.

The graph E represents an example in which an auxiliary control is performed. At time t6, the control for holding the movable electrode 30 in the same position is stopped and a control for restraining the decrease of the pressurizing force is started. In the example illustrated in FIG. 7, the pressurizing force control part 68 controls the electric current supplied to the electrode drive motor 34 so as to maintain the pressurizing force at the same value as the force that is applied when the control for holding the electrode in the same position is stopped. When the pressurizing force is maintained at the same value, electrical conduction resistance does not decrease and hence sufficient heat is supplied to the nugget.

When the inclination of the pressurizing force becomes too small during the period in which the pressurizing force decreases, it is possible to restrain the nugget from cooling down too rapidly by performing the auxiliary control. When the pressurizing force changes more gradually, a rapid change in the residual stress occurring inside the nugget 78 is avoided. By adopting this method, the occurrence of the crack inside the nugget 78 is suppressed. By performing an auxiliary control, deterioration of welding quality is restrained. In particular, the pressurizing force may be corrected too late even if the pressurizing force is corrected after the pressurizing force is detected and the pressurizing force decreases to a predetermined value. According to the present embodiment, since the inclination of the pressurizing force is used for the determination, an abnormality in the welding is detected at an early stage. This method enables the nugget to be restrained from cooling down rapidly at an early stage.

Note that the above-described auxiliary control is described as the control for gradually decreasing the pressurizing force and the control for maintaining the pressurizing force at approximately the same value, but the invention is not limited thereto and may include a control for gradually increasing the pressurizing force.

Next, an auxiliary control performed during the period in which the pressurizing force increases will be described. During the period in which the pressurizing force increases, the inclination of the pressurizing force may become too great. In the case represented by the graph D in FIG. 6, the increase rate of the pressurizing force becomes large due to too large a welding current. The determination part 70 detects that the inclination of the pressurizing force is out of the predetermined judgement range during the period in which the pressurizing force increases. The position control part 69 stops the control for holding the electrode in the same position after electric current is supplied. The pressurizing force control part 68 can control the electrode drive motor 34 so as to decrease the inclination of the pressurizing force.

For example, the pressurizing force control part 68 can decrease electric current supplied to the electrode drive motor 34 so as to decrease the pressurizing force by a predetermined amount of decrease. The relation between the amount of decrease of the pressurizing force and the amount of decrease of the electric current supplied to the electrode drive motor 34 is predefined and stored in the storage part 62. Alternatively, the pressurizing force control part 68 acquires the pressurizing force from the pressurizing force detection part 66. The pressurizing force control part 68 can decrease the electric current supplied to the electrode drive motor 34 until the inclination of the pressurizing force reaches a predetermined inclination.

Alternatively, the pressurizing force control part 68 can control the electrode drive motor 34 so as to maintain the pressurizing force at approximately the same value.

By performing the auxiliary control during the period in which the pressurizing force increases, it is possible to restrain the nugget from growing too rapidly. For example, in the case represented by the graph D in FIG. 6, the nugget expands excessively due to the large welding current. In such a case, the increase rate of the pressurizing force is made to be reduced by performing the auxiliary control. Since the nugget is restrained from overgrowing, an occurrence of spattering and the like can be restrained.

In the above-described auxiliary control performed during the period in which the pressurizing force increases, the control for suppressing the increase rate of the pressurizing force and the control for maintaining the pressurizing force at approximately the same value, but the embodiment is not limited this. The auxiliary control may include a control for gradually decreasing the pressurizing force.

Figure 8:
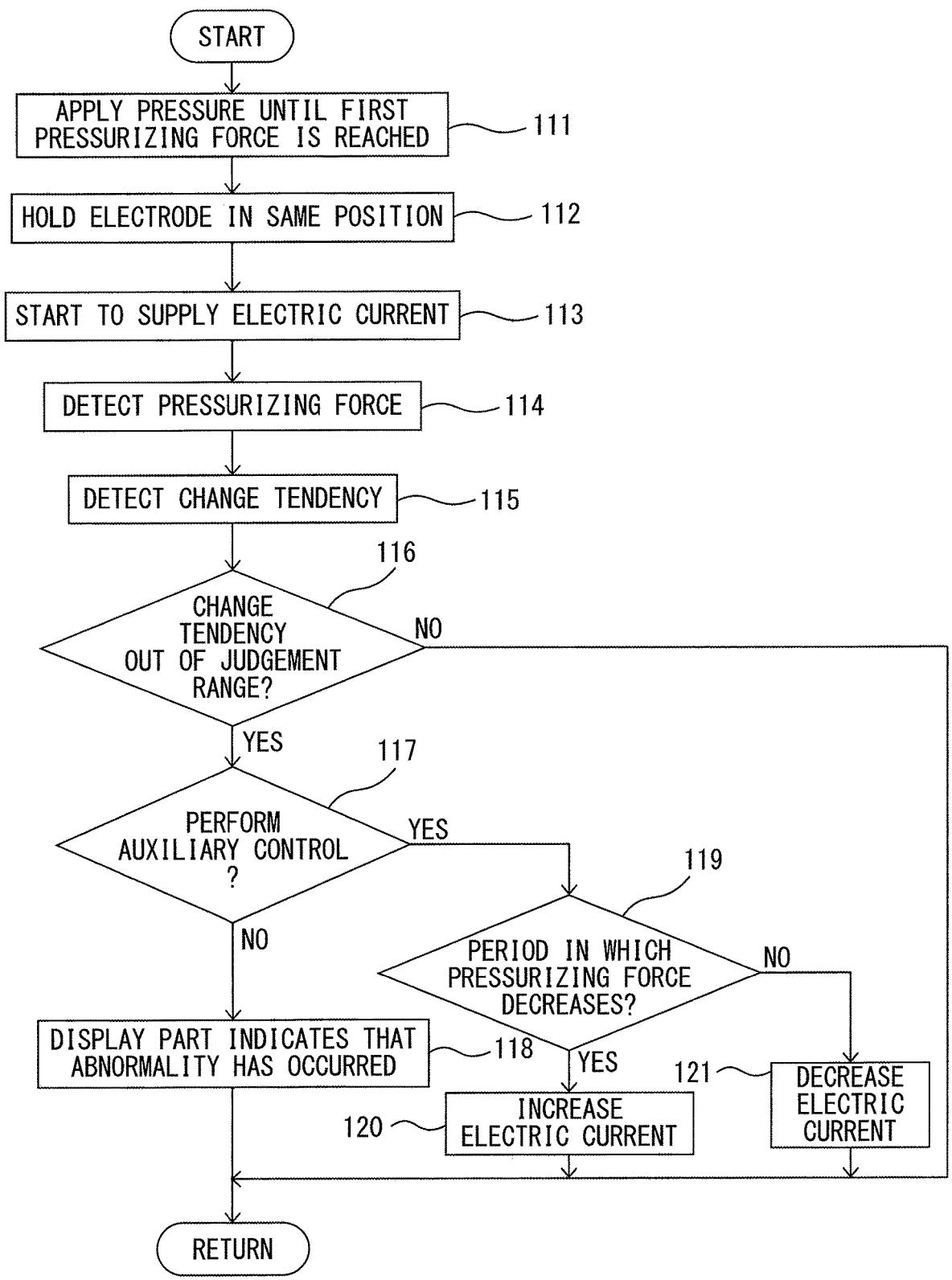
FIG. 8 is a flow chart of a control for judging the welding state according to the embodiment.

FIG. 8 shows a flow chart illustrating the control for judging the welding state and an auxiliary control according to the present embodiment. Before the control illustrated in FIG. 8 is started, the robot 12 and the spot welding gun 14 are driven so as to sandwich the workpiece W between the pair of electrodes 30, 32.

In step 111, the pressurizing force control part 68 drives the electrode drive motor 34 so as to press the workpiece W by the first pressurizing force.

Next, in step 112, after the first pressurizing force is reached, the control by the pressurizing force control part 68 is stopped. The position control part 69 starts the control for holding the movable electrode 30 in the same position. In step 113, the welding gun motion control part 61 starts to supply electric current. At this time, the welding gun motion control part 61 performs the control for supplying electric current of a predetermined value to the electrodes 30, 32.

Next, in step 114, the pressurizing force detection part 66 detects the pressurizing force applied to the workpiece W at a time satisfying a predetermined condition. In step 115, the determination part 70 calculates the change tendency in the pressurizing force based on the detected pressurizing force. For example, in the first control, the determination part 70 calculates the inclination of the pressurizing force as the change tendency.

Next, in step 116, the determination part 70 determines whether or not the change tendency is out of the judgement range. When the change tendency is within the judgement range, this control terminates since it is determined that the welding is performed in a normal state. When the change tendency is out of the judgement range in step 116, it is determined that the welding is performed in an abnormal state. In this case, the control proceeds to step 117.

In step 117, it is determined whether or not the auxiliary control is performed. The information concerning whether or not to perform the auxiliary control can be inputted by the operator to the welding gun control apparatus 18 in advance. When it is determined in step 117 that the auxiliary control is not performed, the control proceeds to step 118.

In step 118, the notification part 71 notifies the robot control apparatus 16 by a signal indicating the occurrence of the abnormality during the welding. The robot control apparatus 16 sends a signal indicating the occurrence of the abnormality during the welding to the operation panel 42. The display part 44 indicates that the abnormality has occurred during the welding. When it is determined in step 117 that the auxiliary control is performed, the control proceeds to step 119.

In step 119, the welding gun motion control part 61 determines whether or not the welding is currently performed in the period in which the pressurizing force decreases. When the welding is currently performed in the period in which the pressurizing force decreases, the control proceeds to step 120. When the welding is currently performed in the period in which the pressurizing force increases, the control proceeds to step 121.

In step 120 and step 121, the auxiliary control is performed. In step 120, the control for increasing the electric current supplied to the electrode drive motor 34 is performed so as to suppress the reduction rate of the pressurizing force. In step 121, the control for decreasing the electric current supplied to the electrode drive motor 34 is performed so as to suppress the increase rate of the pressurizing force. These auxiliary controls are performed until the welding is completed.

Figure 9:
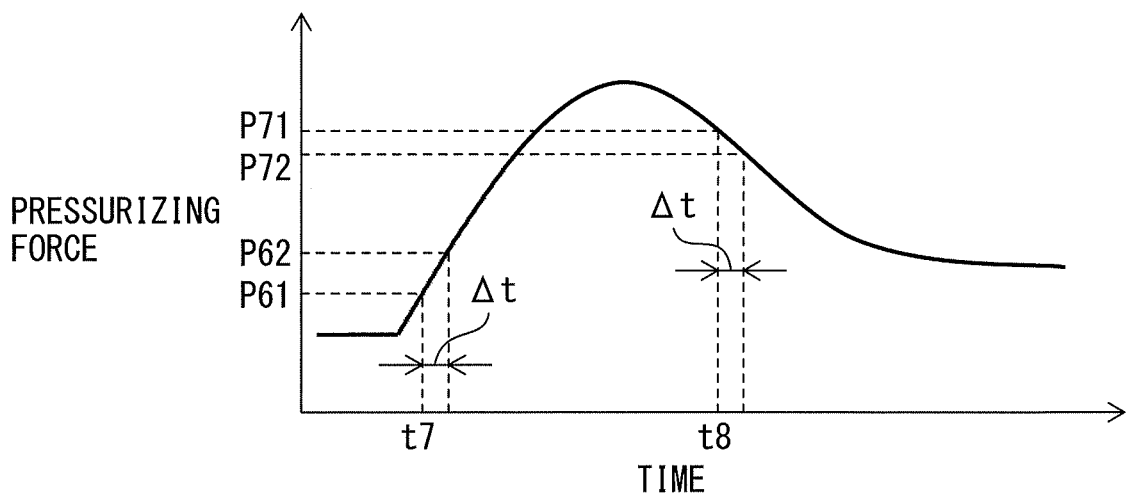
FIG. 9 is a graph for illustrating third control for judging the welding state according to the embodiment.

FIG. 9 shows a graph for describing third control for judging the welding state. In the third control, the determination part 70 does not make a judgement based on the inclination of the pressurizing force at a predetermined time after electric current is supplied, but based on the inclination of the pressurizing force at a detected magnitude of the pressurizing force.

In the storage part 62, a judgement range for the inclination of the pressurizing force with respect to the magnitude of the pressurizing force is stored in advance. At predetermined time t7 after the supply of the electric current is started, the pressurizing force detection part 66 detects a pressurizing force P61. The pressurizing force detection part 66 also detects a pressurizing force P62 at a time when a time difference Δt has elapsed.

The determination part 70 calculates the inclination of the pressurizing force at the pressurizing force P61 based on the pressurizing force P61, the pressurizing force P62, and the time difference Δt in the period in which the pressurizing force increases. The determination part 70 acquires the judgement range for the inclination at the pressurizing force P61. The determination part 70 determines that the welding is performed in the abnormal state when the inclination at the pressurizing force P61 is out of the judgement range.

In the period in which the pressurizing force decreases, pressurizing force detection part 66 similarly detects pressurizing forces P71, P72. The determination part 70 acquires a judgement range for the inclination at the pressurizing force P71. The determination part 70 calculates the inclination of the pressurizing force at the pressurizing force P71. The determination part 70 determines that the welding is performed in the abnormal state when the inclination of the pressurizing force at the pressurizing force P71 is out of the judgement range.

With reference to FIG. 6, the inclination of the pressurizing force at a predetermined pressurizing force in the graph D is different from the inclination of the pressurizing force at the predetermined pressurizing force in the graph A. In the graph B and the graph C, the inclination of the pressurizing force at a predetermined pressurizing force in the period in which the pressurizing force decreases is different from the inclination in the graph A. Thus, the determination part 70 can make a judgement based on the judgement range for the inclination of the pressurizing force at a magnitude of the pressurizing force.

Note that in the above-described third control, the time at which the pressurizing force is detected is predetermined, but the invention is not limited thereto. For example, a pressurizing force at which the determination is made may be predetermined and stored in the storage part 62. The pressurizing force detection part 66 detects the pressurizing force P at predetermined intervals. The determination part 70 may make the judgement about the welding state when the pressurizing force reaches the magnitude at which a determination is to be made.

Figure 10:
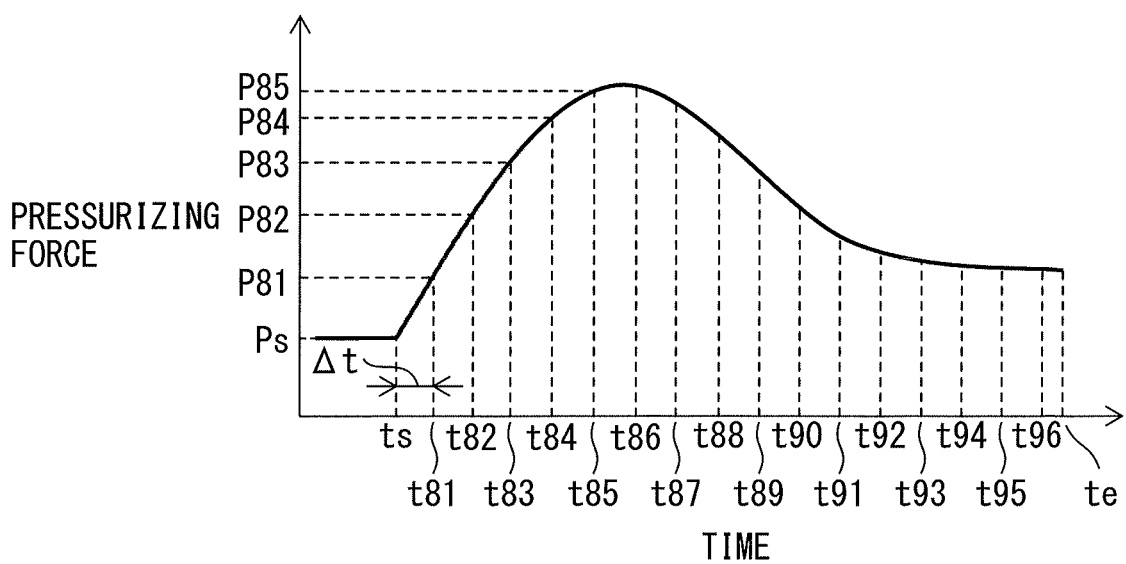
FIG. 10 is a graph for illustrating fourth control for judging the welding state according to the embodiment.

FIG. 10 shows a graph for describing fourth control for determining a welding state. In the fourth control, the above-described first control is repeated at every predetermined time interval. In other words, the first control is continuously repeated during the period in which electric current is supplied.

After the supply of electric current is started at time ts, the pressurizing force detection part 66 detects the pressurizing force at every predetermined time interval Δt and the determination part 70 makes the determination about the inclination of the pressurizing force. For example, the determination part 70 makes the determination about the inclination of the pressurizing force between time ts and time t81, makes the determination about the inclination of the pressurizing force between time t81 and t82, and further repeats such determination. A judgement range for the inclination of the pressurizing force with respect to each period is predetermined and stored in the storage part 62. In each period, the determination part 70 determines that the welding is performed in the abnormal state when the inclination of pressurizing force is out of the judgement range. By performing this control, it is possible to make a judgement based on the changes of the pressurizing force in time series. In the fourth control, the judgement of the welding state can be performed more accurately than the first control. Alternatively, the fourth control enables an earlier detection of an abnormality occurring during the welding.

Although the first control is repeated in the example illustrated in FIG. 10, the invention is not limited thereto and the third control may be repeated.

In the above-described embodiment, the pressurizing force detection part 66 detects the pressurizing force based on the magnitude of electric current supplied to the electrode drive motor 34, but the invention is not limited thereto and the pressurizing force detection part 66 may estimate the pressurizing force by any control.

Figure 11:
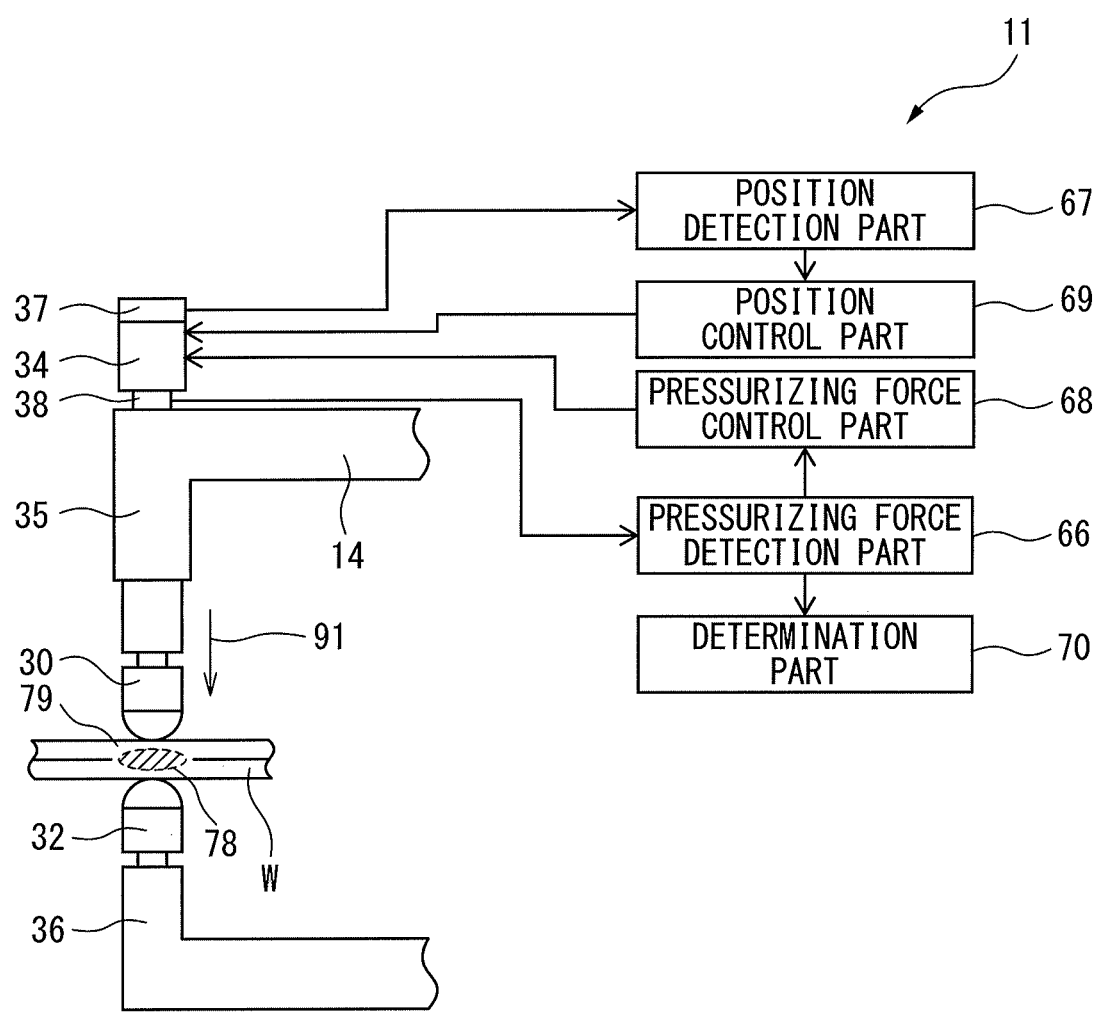
FIG. 11 is a schematic diagram of second spot welding apparatus according to the embodiment.

FIG. 11 shows an enlarged schematic diagram of electrodes of second spot welding apparatus according to the present embodiment. The second spot welding apparatus 11 has a torque sensor 38 provided on the output shaft of the electrode drive motor 34. The pressurizing force detection part 66 can detect the pressurizing force based on the output of the torque sensor 38. As has been described, the actual pressurizing force may be detected by providing the torque sensor 38. The torque sensor 38 may be disposed in a surrounding area of the ball screw that is used for driving the movable electrode 30.

The judgement range for the change tendency according to the present embodiment may be determined in advance. The judgement range for the change tendency may be set based on results of welding workpieces. The judgement range for the change tendency may be set by learning a plurality of results. Next, a method of setting the judgement range by machine learning will be described below.

With reference to FIG. 1 and FIG. 2, the control apparatus 15 according to the present embodiment includes a machine learning apparatus 19. The machine learning apparatus 19 includes an electronic control unit including a CPU and other devices. The machine learning apparatus 19 is connected to the welding gun control apparatus 18. The machine learning apparatus 19 can be configured so as to acquire information that relates to the welding from the welding gun control apparatus 18. The robot control apparatus 16 or the welding gun control apparatus 18 may be equipped with the function of the machine learning apparatus 19.

A machine learning apparatus has a function of analyzing data sets that are inputted to the device and extracting useful rules, knowledge expression, judgement criteria, and the like that are contained in the data sets, and outputting the judgement result as well as learning knowledge. There are various techniques therefor, which can be roughly categorized into "supervised learning", "unsupervised learning", and "reinforcement learning". Furthermore, there is a technique called "deep learning", in which the machine learns to extract feature amounts for implementing these techniques.

In supervised learning, a large number of data sets of certain inputs and results (labels) are fed into a machine learning apparatus, which learns features contained in these data sets and inductively acquires a model for estimating results from the inputs, i.e., their relationships. This can be achieved by using an algorithm such as a neural network.

The unsupervised learning is a learning in which, by feeding input data alone to a machine learning apparatus in large amounts, a device learns distributions of the input data and, for example, compresses, classifies, and shapes the input data without corresponding teacher output data being fed into the apparatus. This allows, e.g., clustering of similar features contained in these data sets. The obtained result can be used to define certain criteria, and by allocating outputs in such a manner that the outputs are optimized according to the criteria, it is possible to predict the outputs. Further, there is a method that is referred to as "semi-supervised learning", which exploits a problem setting that may be characterized as being halfway between "unsupervised learning" and "supervised learning". This is a case in which only a part of the data is provided in the form of data sets of inputs and outputs while the remaining data consists of inputs alone.

In the reinforcement learning, a problem setting is provided in the following.

The machine learning apparatus observes the state of the environment and determines an action.

The environment changes according to a certain rule and the action of itself may affect the environment.

Every time an action is taken, a reward signal is returned.

The total (discounted) reward for the future is to be maximized.

Learning starts in a state in which the result of an action is totally unknown, or only partially known. The machine learning apparatus can obtain a result serving as data only after it takes the action. In other words, an optimal action needs to be sought by trial and error.

Learning can also be started from an appropriate point by starting from an initial state that is learned in advance so as to imitate human motions (techniques such as the above-described supervised learning or reverse reinforcement learning).

Reinforcement learning is a method in which, in addition to determination and classification, actions are learned for learning appropriate actions taking into consideration the interaction exerted on the environment by actions, i.e., for learning to maximize the reward to be obtained in the future. It follows that, according to the present embodiment, actions that affect the future can be acquired. In the following, Q-learning will be described as an example, but the invention is not limited to the Q-learning.

The Q-learning is a method for leaning a value Q (s, a) for selecting an action a in an environmental state s. In other words, the action a that has the highest value Q (s, a) in the state s is preferably selected as the optimal action. However, the correct value of Q (s, a) is totally unknown at first with respect to a pair of the state s and the action a. The agent (the subject of the action) selects the action a among various options in the state s, and a reward is given in response to the selected action a. By this operation, the agent learns to select a better action, i.e., the correct value Q (s, a).

Since it is necessary to maximize the sum of the rewards to be obtained in the future as a result of the actions, $Q(s, a)=E[\Sigma \gamma^t r_t]$ is to be satisfied in the end. (The expected value is taken in a state that follows the optimal action. The optimal action, which is obviously unknown, is to be learned by a search.) An updating equation of such a value Q (s, a) is given by, for example, equation (1).

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

Herein, $s_t$ is the environmental state at time t and $a_t$ is the action at time t. By action $a_t$, the state changes to $s_{t+1}$. $r_{t+1}$ represents the reward received as a result of the change in the state. The term with "max" is the product of the Q-value multiplied by γ when the action a that has the highest Q-value known in the state $s_{t+1}$ is selected. γ is a parameter called discount rate, satisfying $0<\gamma\leq 1$. α is a learning factor satisfying $0<\alpha\leq 1$.

This Equation represents a method for updating the evaluation value $Q(s_t, a_t)$ of action $a_t$ in state $s_t$, based on reward $r_{t+1}$ returned as a result of trial $a_t$. When the evaluation value $Q(s_{t+1}, \max a_{t+1})$ of the best action max a in the state subsequent to state s according to the reward $r_{t+1}$ and action a is greater than the evaluation value $Q(s_t, a_t)$ of action a in state s, $Q(s_t, a_t)$ is increased, otherwise, $Q(s_t, a_t)$ is reduced. In other words, the value of a particular action in a particular state is brought closer to the reward immediately returned as a result and the value of the best action in the subsequent state upon the particular action.

Methods for representing Q (s, a) on a computer include a method in which the values for all state-action pairs (s, a) are held in the form of a table (action value table) and a method in which a function for approximating Q (s, a) is provided. With the latter method, above-mentioned updating equation can be implemented by adjusting the parameter of an approximation function using a technique such as the stochastic gradient descent method. As the approximation function, a neural network can be used, for example.

Figure 12:
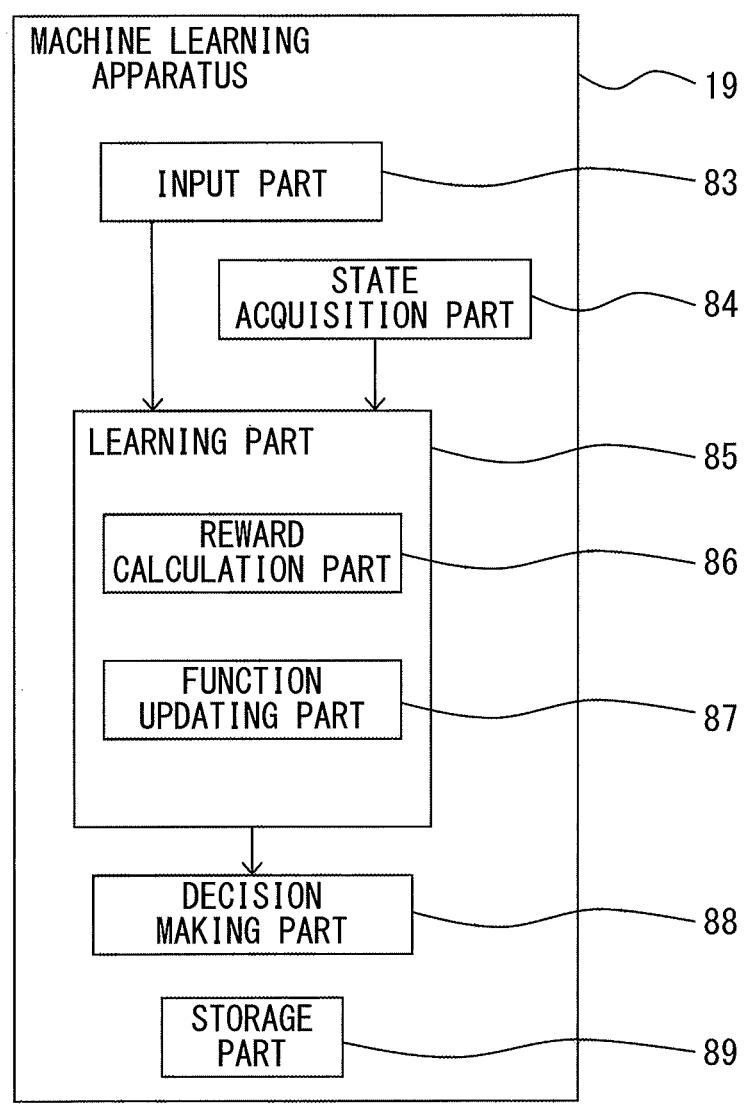
FIG. 12 is a block diagram of a machine learning apparatus according to the embodiment.

FIG. 12 shows a block diagram of a machine learning apparatus according to an embodiment. With reference to FIG. 2 and FIG. 12, the machine learning apparatus 19 according to the present embodiment sets an initial judgement range and then updates the judgement range by reinforcement learning. The machine learning apparatus 19 includes an input part 83, a state acquisition part 84, and a learning part 85. The machine learning apparatus 19 also includes a decision making part 88 and a storage part 89. The storage part 89 stores any information that relates to the machine learning.

The state acquisition part 84 acquires data on the state of the spot welding from the welding gun control apparatus 18 when the welding is performed. According to the present embodiment, the state acquisition part 84 acquires the state of the spot welding apparatus when the judgement is made. The operator inputs information that relates to the quality of the welding such as test results of the welding to the learning part 85 via the input part 83.

The learning part 85 sets an evaluation function (action value). The learning part 85 updates an action value table based on inputted information. The action value table according to the present embodiment is a table including the evaluation function established based on the learning, rewards, data on the state of the spot welding apparatus, and test results of the workpiece.

A reward calculation part 86 sets rewards based on information to be acquired. For example, the operator conducts a test on the workpiece in which the welding was actually performed. The operator inputs the results of the test to the machine learning apparatus 19. The reward calculation part 86 can set a larger reward as a diameter of the nugget is closer to a desired size. A tensile strength test on the weld may be conducted after the welding. The reward calculation part 86 can set a larger reward for a greater tensile strength. Alternatively, the reward calculation part 86 can set a large reward when there is no crack in the weld.

A function updating part 87 updates the action evaluation function based on the acquired information and the reward that is set by the reward calculation part 86. An action corresponds to a judgement range. The decision making part 88 sets a judgement range based on the evaluation function set by the learning part 85. For example, the decision making part 88 may select the judgement range in which the action value is high.

As described above, by setting the judgement range through machine learning, it is possible to make a judgement based on the appropriate judgement range. Further, in a case in which judgement ranges are set in time series as described above for the third control, machine learning is effective since the number of data to be processed is large. By setting judgement ranges in time series, an ideal change in the pressurizing force is acquired.

The spot welding gun according to the present embodiment is supported by a robot, but the invention is not limited thereto and the welding gun may be supported by any apparatus. For example, the spot welding gun may be fixed to a fixing device while the robot is configured to move the workpiece.

According to the present invention, the spot welding apparatus that makes the determination for the welding state while the welding is performed can be provided.

In each of the above-described controls, the order of the steps may be changed as appropriate as long as the functions and actions remain unaltered. The above-described embodiments may be combined as appropriate.

In the drawings referred to above, identical or corresponding parts are denoted by the same numerals. Note that the above-described embodiments are for illustrative purposes only and are not intended to limit the invention in any way. Furthermore, the embodiments encompass any modification of an embodiment in the scope of the appended claims.

The invention claimed is:

1. A spot welding apparatus comprising:
a spot welding gun including a pair of electrodes disposed opposite to each other and an electrode drive motor driving at least one electrode of the pair of electrodes; and
a welding gun controller including a processor for controlling the spot welding gun, the processor programmed to:
control a pressurizing force by commanding an electrode drive circuit to supply electric current to the electrode drive motor of at least one electrode of the pair of electrodes to control the position of the at least one electrode of the pair of electrodes, and by calculating the pressurizing force that the pair of electrodes apply to a workpiece based on a value of the electric current supplied to the electrode drive motor,
command the electrode drive circuit such that the electric current supplied by the electrode drive circuit controls the electrode drive motor to control the pressurizing force applied by the electrodes to be a predetermined initial pressurizing force before electric current is supplied,
command the electrode drive circuit such that the electric current supplied by the electrode drive circuit controls the electrode drive motor to hold the electrodes, after the supply of the electric current is started, at positions when the initial pressurizing force is applied before the electric current is supplied, and determine whether or not the welding is performed in a normal state based on change tendency including a rate of change of the pressurizing force during a period in which the pressurizing force increases or decreases,
when the rate of change of the pressurizing force is determined to be increasing at greater than or equal to a first threshold, command the electrode drive circuit such that the electric current supplied by the electrode drive circuit controls the electrode drive motor to stop holding the electrodes in a same position after the supply of the electric current is started while controlling the electrode drive motor to decrease the rate of change of the pressurizing force such that the pressurizing force is increasing at less than the first threshold, and
when the rate of change is determined to be decreasing at greater than or equal to a second threshold, command the electrode drive circuit such that the electric current supplied by the electrode drive circuit controls the electrode drive motor to stop holding the electrodes in a same position after the supply of the electric current is started while controlling the electrode drive motor to decrease the rate of change of the pressurizing force such that the pressurizing force is decreasing at less than the second threshold.

2. The spot welding apparatus according to claim 1, wherein the processor is further configured to:
store a judgement range for the rate of change of the pressurizing force with respect to a magnitude of the pressurizing force during the period in which the pressurizing force increases or the period in which the pressurizing force decreases, and determine that the welding is performed in an abnormal state when the rate of change of the pressurizing force with respect to a predetermined magnitude of the pressurizing force is out of the judgement range.

3. The spot welding apparatus according to claim 1, wherein the processor is further configured to:

store a judgement range for the rate of change of the pressurizing force with respect to a predetermined time after the supply of the electric current is started, and determine that the welding is performed in an abnormal state when the rate of change of the pressurizing force with respect to a time at which the supply of the electric current is started is out of the judgement range.

4. The spot welding apparatus according to claim 1, wherein the processor is further configured to:

store a judgement range for the rate of change of the pressurizing force with respect to predetermined time interval after the supply of the electric current is started, and determine whether or not the rate of change of the pressurizing force is out of the judgement range in the predetermined time interval, and determines that the welding is performed in an abnormal state when the rate of change of the pressurizing force is out of the judgement range.

5. The spot welding apparatus according to claim 1, wherein the processor is further configured to set a judgement range for the change tendency by machine learning.

6. The spot welding apparatus according to claim 1, wherein the processor is further configured to:

output a notification that the welding is performed in an abnormal state when the processor determines that the welding is performed in the abnormal state when the rate of change of the pressurizing force is out of a judgement range.

* * * * *